P. M. FINK.
AXLE.
APPLICATION FILED DEC. 24, 1910.

1,008,317.

Patented Nov. 14, 1911.

Pius M. Fink,
Inventor

Witnesses by

Attorneys

UNITED STATES PATENT OFFICE.

PIUS M. FINK, OF MIAMI, OKLAHOMA.

AXLE.

1,008,317.      Specification of Letters Patent.    Patented Nov. 14, 1911.

Application filed December 24, 1910. Serial No. 599,200.

*To all whom it may concern:*

Be it known that I, PIUS M. FINK, a citizen of the United States, residing at Miami, in the county of Ottawa and State of Oklahoma, have invented a new and useful Axle, of which the following is a specification.

It is the object of this invention to provide an axle so constructed that power may be applied to the forward axle of a motor propelled vehicle, as well as to the rear axle thereof, and with this end in view, the invention resides primarily in providing a driving member and a driven member, equipped with interfitting teeth of novel and improved form, whereby the axes of the driving member and the driven member may be moved out of alinement without disturbing the operative relation between these members.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

Figure 1:
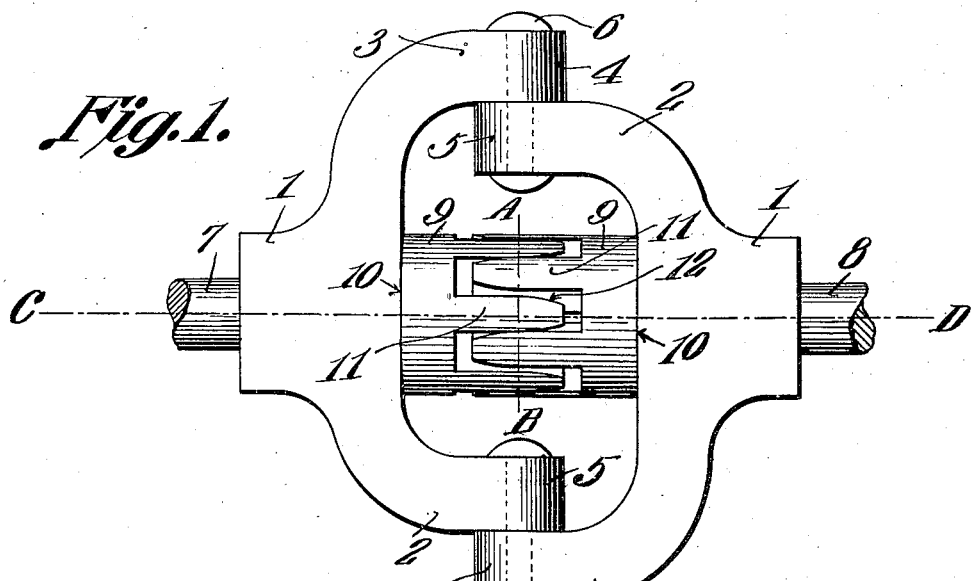
Figure 2:
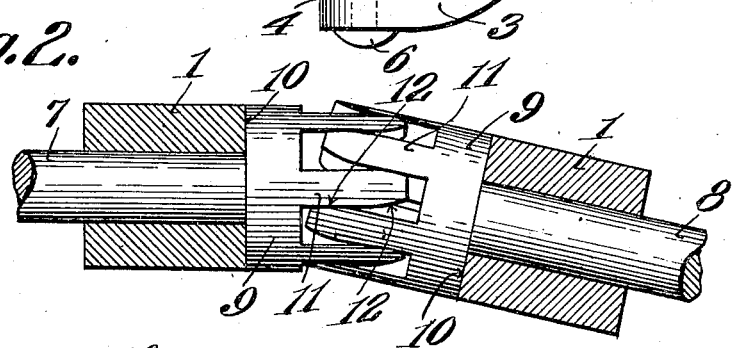
Figure 3:
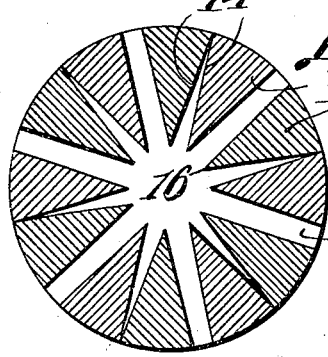
Figure 4:
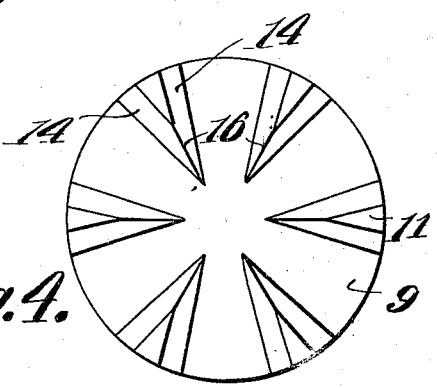
Figure 5:
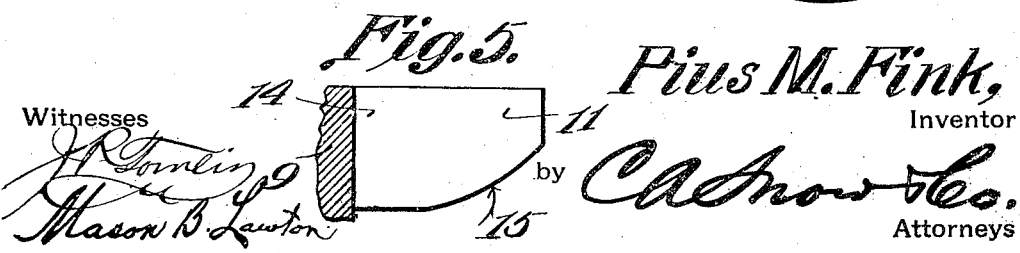

In the drawings,—Figure 1 is a side elevation. Fig. 2 is a section on the line C—D of Fig. 1, the driving member and the driven member being shifted out of axial alinement; Fig. 3 is a section on the line A—B of Fig. 1; Fig. 4 is an end elevation of one of the heads which are at the ends of the driving and driven members; and Fig. 5 is a side elevation of one of the teeth of the heads, a part of the head proper being shown in section.

In carrying out the invention there is provided, as shown in Fig. 1, a pair of U-shaped members which are duplicates of each other. These U-shaped members are each provided with a bearing 1 and with arms 2 and 3 projecting from the bearing 1, the arms outstanding away from the bearing 1. The bearing 1 is disposed nearer to the end 5 of the arm 2 than to the end 4 of the arm 3, and by this construction, the end 4 of one of the members may be overlapped upon the end 5 of the other member and united by pivot elements 6, the bearings 1 of the U-shaped members being maintained in alinement. By thus positioning the bearing 1 relatively near to the end 5 of the arm 2, it is possible to use a single form of U-shaped member for both elements of the pivotally connected structure above described.

The invention further includes a driven member 7 and a driving member 8, the driven member 7 being the movable end of the axle, upon which the wheel is mounted, the driving member 8 being the portion of the axle which is held for rotation, the power being applied to the driving member 8. These members 7 and 8 are rotatable in the bearings 1. The members 7 and 8 are provided at their adjacent ends with outstanding heads 9. These heads 9 bear against the inner faces 10 of the U-shaped members to hold in mesh teeth 11 which are formed in the heads 9. These teeth 11 interfit loosely, each tooth being tapered toward its free end as denoted by the numeral 12. The side faces 14 of each tooth 11 converge toward the axis of the head 9, to define an inner edge 16, the teeth 11 being thus triangular in cross section. Moreover, the inner edges 16 of the teeth 11 are curved as at 15, away from the axes of the heads 9.

It will be seen that since the U-shaped members are pivotally connected by means of the elements 6, these U-shaped members will have relative movement. Moreover, by reason of the configuration of the teeth 11, the axes of the driving member 8 of the driven member 7 may be moved out of alinement, as shown in Fig. 2, without breaking the operative engagement between the driving member 8 and the driven member 7, continuous rotation being imparted to the driven member 7 by the driving member 8 when the axes of these members are positioned out of alinement, as shown in Fig. 2. Thus, power may be applied to the front axle of a vehicle, without interfering with the necessary swinging movement of the pivoted ends of the axles, these pivoted ends being represented by the driven members 7. The tapering of the teeth 11, as shown at 12, serves to permit the angular positioning of the driving member 7 and the driven member 8, as Fig. 2 will clearly show, the triangular cross section of the teeth 11 permitting the necessary movement in the vicinity of the axes of the heads 9. Moreover, by reason of the fact that the edges 16 are rounded as at 15, there will be, at the inner corner of each tooth, no outstanding angle to engage against the adjacent side face 14 of the next tooth, thereby limiting the shifting of the axes of the members 7 and 8 with respect to each other.

Having thus described the invention, what is claimed is:—

A device of the class described comprising a driving member and a driven member, each consisting of a head and outstanding teeth, the teeth of one member interfitting loosely with the teeth of the other member; each tooth being of a continuous, triangular cross section adjacent its head, and having its inner longitudinal edge curved adjacent its free end; the outer, longitudinal edges of the teeth of each member being parallel, adjacent the head, and each edge being disposed in a common plane with the axis of said head; whereby, when the axes of the heads are alined and the said outer longitudinal edges of the teeth of one head engage with the corresponding outer edges of the teeth of the other head, the force exerted by the driving member, will have no component tending to effect a lateral separation of the teeth of one member from the teeth of the other member.

In testimony that I claim the foregoing as my own, I have hereto affixed my signature in the presence of two witnesses.

PIUS M. FINK.

Witnesses:
F. D. FULKERSON,
C. R. JENNISON.

---

Copies of this patent may be obtained for five cents each, by addressing the "Commissioner of Patents, Washington, D. C."